US009801049B2

(12) United States Patent
Koo

(10) Patent No.: US 9,801,049 B2
(45) Date of Patent: Oct. 24, 2017

(54) METHOD AND SYSTEM FOR CONTINUOUSLY FORWARDING MONITORED INFORMATION OF MACHINE-TO-MACHINE DEVICES BY A SUBSCRIBER'S REGISTERED TERMINALS TO A DESIGNATED USER TERMINAL

(71) Applicant: KT CORPORATION, Gyeonggi-do (KR)

(72) Inventor: Bum-Mo Koo, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 813 days.

(21) Appl. No.: 13/966,615

(22) Filed: Aug. 14, 2013

(65) Prior Publication Data
US 2014/0052775 A1 Feb. 20, 2014

(30) Foreign Application Priority Data
Aug. 14, 2012 (KR) .................. 10-2012-0088682

(51) Int. Cl.
G06F 15/16 (2006.01)
H04W 8/24 (2009.01)
(Continued)

(52) U.S. Cl.
CPC .............. *H04W 8/245* (2013.01); *H04N 7/18* (2013.01); *H04W 76/023* (2013.01);
(Continued)

(58) Field of Classification Search
CPC ... H04W 8/245; H04W 76/023; H04W 4/005; H04W 88/04; H04W 4/12; H04N 7/18; G06Q 10/00
See application file for complete search history.

(56) References Cited

U.S. PATENT DOCUMENTS 5,377,267 A 12/1994 Suzuki et al.
6,009,461 A * 12/1999 Yamano ................. G06Q 30/02
709/204
(Continued)

FOREIGN PATENT DOCUMENTS

JP 2003-116181 A 4/2003
JP 2005135245 A * 5/2005
(Continued)

*Primary Examiner* — Oanh Duong
(74) *Attorney, Agent, or Firm* — IP Legal Services, LLC

(57) ABSTRACT

The disclosure is related to providing a monitoring service to user terminals regardless of whether the user terminals are registered at a server for the monitoring service and whether the user terminals are installed with an application dedicatedly programmed for the monitoring service. The server may receiving a data forward request message from a first one of subscriber's registered user terminals for forwarding target monitoring information to a designated user terminal, process the target monitoring information to be processable at the designated user terminal, and transmit a connection request message and the processed target monitoring information to the first one of subscriber's registered user terminals. The first one of subscriber's registered user terminals receives the connection request message and the processed target monitoring information from the server and forwards the processed target monitoring information to the designated user terminal in response to the request message.

15 Claims, 6 Drawing Sheets

(51) Int. Cl.
*H04W 76/02* (2009.01)
*H04N 7/18* (2006.01)
*H04W 4/00* (2009.01)
*H04W 4/12* (2009.01)
*G06Q 10/00* (2012.01)
*H04W 88/04* (2009.01)

(52) U.S. Cl.
CPC ............ *G06Q 10/00* (2013.01); *H04W 4/005* (2013.01); *H04W 4/12* (2013.01); *H04W 88/04* (2013.01)

(56) References Cited

U.S. PATENT DOCUMENTS

| | | | |
|---|---|---|---|
| 6,553,099 B1 * | 4/2003 | Gundlach | H04L 63/00 379/35 |
| 6,970,183 B1 * | 11/2005 | Monroe | G08B 7/062 348/143 |
| 7,363,003 B2 | 4/2008 | Takatani et al. | |
| 8,676,195 B2 | 3/2014 | Zhang et al. | |
| 2002/0175819 A1 * | 11/2002 | Joo | G08B 21/0222 340/573.1 |
| 2003/0037170 A1 * | 2/2003 | Zeller | H04L 12/2834 709/253 |
| 2004/0125789 A1 * | 7/2004 | Parker | H04N 21/25891 370/352 |
| 2005/0021785 A1 | 1/2005 | Nakaji | |
| 2006/0066900 A1 * | 3/2006 | Abe | G03G 15/5075 358/1.15 |
| 2006/0172766 A1 | 8/2006 | Kim et al. | |
| 2006/0173708 A1 * | 8/2006 | Vining | A61B 5/0002 705/2 |
| 2007/0058789 A1 | 3/2007 | Lim et al. | |
| 2007/0153993 A1 * | 7/2007 | Cohen | H04M 11/002 379/100.05 |
| 2007/0224997 A1 | 9/2007 | Florkey et al. | |
| 2007/0273499 A1 * | 11/2007 | Chlubek | G06Q 50/26 340/521 |
| 2009/0060514 A1 | 3/2009 | DiChiro et al. | |
| 2009/0217364 A1 | 8/2009 | Salmela et al. | |
| 2010/0002582 A1 | 1/2010 | Luft et al. | |
| 2010/0011063 A1 | 1/2010 | Blaiotta et al. | |
| 2010/0127850 A1 * | 5/2010 | Poder | G08B 13/2491 340/517 |
| 2010/0138484 A1 | 6/2010 | Lee et al. | |
| 2010/0146117 A1 | 6/2010 | Hoeksel | |
| 2010/0177663 A1 | 7/2010 | Johansson et al. | |
| 2010/0318913 A1 | 12/2010 | Cupala et al. | |
| 2011/0090334 A1 * | 4/2011 | Hicks, III | G08B 13/19656 348/143 |
| 2011/0235520 A1 * | 9/2011 | Maciej | H04M 3/42221 370/241 |
| 2011/0264914 A1 | 10/2011 | Bae et al. | |
| 2011/0265158 A1 | 10/2011 | Cha et al. | |
| 2011/0321147 A1 | 12/2011 | Chakra et al. | |
| 2012/0004003 A1 | 1/2012 | Shaheen et al. | |
| 2012/0124228 A1 | 5/2012 | Yu et al. | |
| 2012/0131338 A1 * | 5/2012 | Bellwood | H04L 9/0836 713/168 |
| 2012/0203905 A1 | 8/2012 | Lee et al. | |
| 2012/0207113 A1 | 8/2012 | Yoon et al. | |
| 2013/0094494 A1 | 4/2013 | Lim et al. | |
| 2013/0142118 A1 | 6/2013 | Cherian et al. | |
| 2013/0212236 A1 | 8/2013 | Foti et al. | |
| 2013/0246519 A1 * | 9/2013 | Foti | H04W 4/08 709/204 |
| 2013/0295983 A1 * | 11/2013 | Kim | H04W 52/146 455/522 |
| 2013/0332554 A1 | 12/2013 | Lee | |
| 2014/0006612 A1 * | 1/2014 | Fallon | H04L 12/2602 709/224 |
| 2014/0006629 A1 | 1/2014 | Lau et al. | |
| 2014/0038549 A1 | 2/2014 | Bart Lehane et al. | |
| 2014/0220951 A1 | 8/2014 | Gumbrell et al. | |
| 2014/0242940 A1 | 8/2014 | Koo | |
| 2014/0244834 A1 | 8/2014 | Guedalia et al. | |
| 2014/0256285 A1 | 9/2014 | Koo | |
| 2015/0055557 A1 | 2/2015 | Dong et al. | |
| 2015/0245161 A1 | 8/2015 | Pareglio et al. | |

FOREIGN PATENT DOCUMENTS

| | | |
|---|---|---|
| JP | 2009-239727 A | 10/2009 |
| KR | 10-2006-0089030 A | 8/2006 |
| KR | 10-2006-0096602 A | 9/2006 |
| KR | 10-2006-0096602 * | 11/2006 |
| KR | 10-0673165 B1 | 1/2007 |
| KR | 10-2008-0024481 A | 3/2008 |
| KR | 10-2008-0050044 A | 6/2008 |
| KR | 10-2009-0051933 A | 5/2009 |
| KR | 10-0909542 B1 | 7/2009 |
| KR | 10-2010-0029383 A | 3/2010 |
| KR | 10-2010-0061406 A | 6/2010 |
| KR | 10-2011-0133709 A | 12/2011 |
| KR | 10-2012-0050738 A | 5/2012 |
| KR | 10-2012-0056401 A | 6/2012 |
| KR | 10-2012-0093559 A | 8/2012 |
| KR | 10-2012-0098899 A | 9/2012 |

* cited by examiner

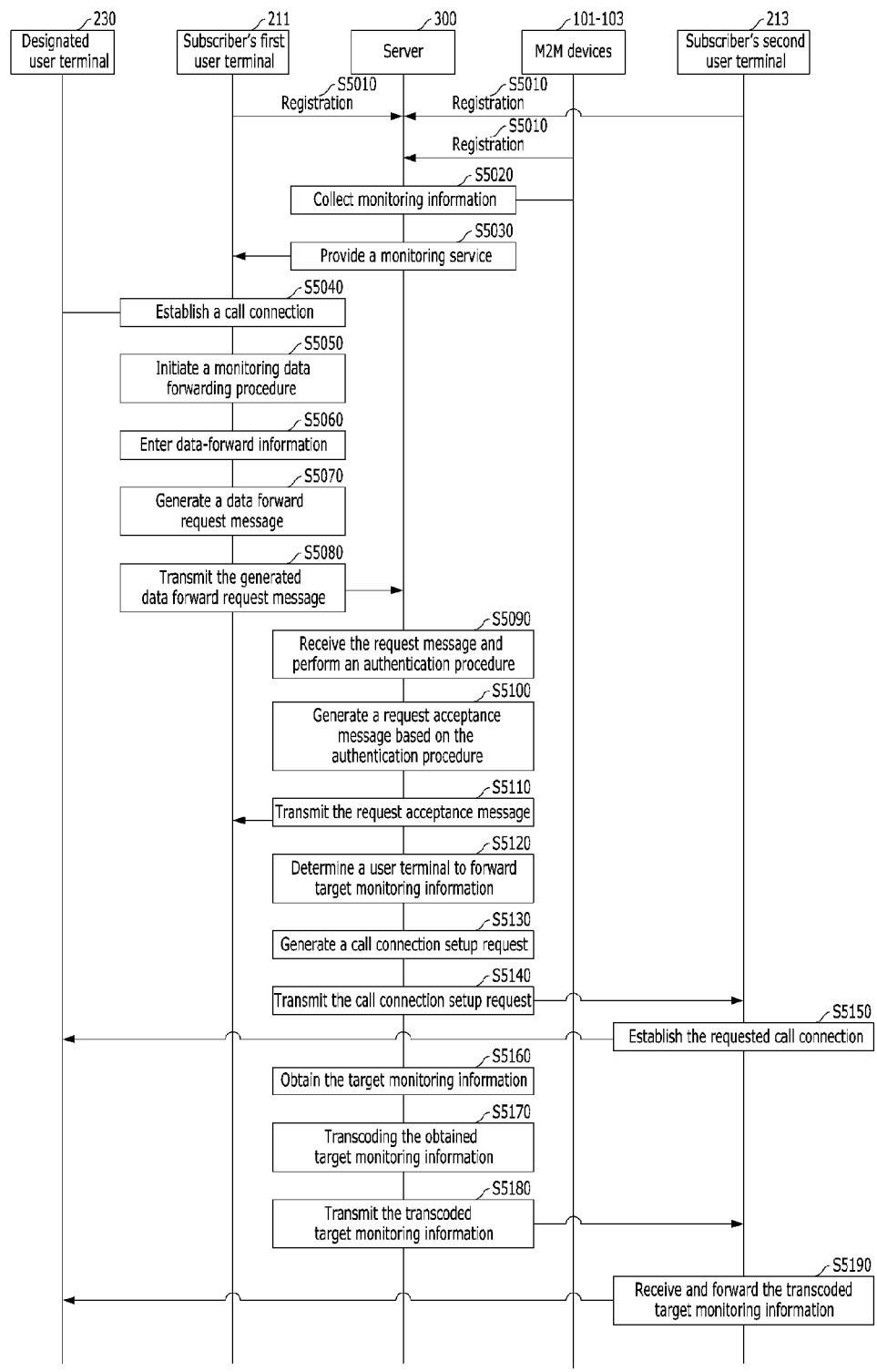

FIG. 6

| User terminal | PUID(tel, SIP-URI) | Call-ID | SDP(Supported Media and codec) | Capability | SMS/MMS | Model Code |
|---|---|---|---|---|---|---|
| Subscriber's first user terminal | sip:bmk@ktann.com user terminal | 1dd6c671b3b-12b4we@ktann.com | m=video 3400 RTP/AVPF 0 98 99<br>m=audio 3458 RTP/AVPF 0 96 97 | 5 | 1 | SS301-102W |
| Subscriber's second user terminal | tel:+8201088808888 | qdw6c671b3b 12b4we@ktann.com | m=audio 3456 RTP/AVPF 0 96 | 1 | 0 | AT201-603D |
| Designated user terminal | tel:+8201077707777 | 1dd6c671b3b-sdqp4e@ktann.com | m=audio 20736 RTP/AVPF 0 96 97<br>m=video 30736 RTP/AVPF 0 98 99 | 3 | 1 | AP301-201W |

METHOD AND SYSTEM FOR CONTINUOUSLY FORWARDING MONITORED INFORMATION OF MACHINE-TO-MACHINE DEVICES BY A SUBSCRIBER'S REGISTERED TERMINALS TO A DESIGNATED USER TERMINAL

CROSS REFERENCE TO PRIOR APPLICATIONS

The present application claims priority under 35 U.S.C. §119 to Korean Patent Application No. 10-2012-0088682 (filed on Aug. 14, 2012), which is hereby incorporated by reference in its entirety.

BACKGROUND

The present disclosure relates to machine to machine communication, more particularly, to forwarding information on monitoring a certain area to a user terminal using at least one of subscriber's user terminals.

Machine to machine (M2M) communication has enabled many convenient features and services. One of the convenient features and services provided through M2M communication is a remote monitoring system. A typical remote monitoring system remotely monitors a target area and provides monitoring results to a subscriber using M2M communication technology.

A typical remote monitoring system monitors activities in a target area from a remote location. Such a typical remote monitoring system may be implemented based on a wireless sensor network and/or a M2M communication protocol. The typical remote monitoring system may include a home security system, a traffic monitoring system, a water quality monitoring system, and so forth. Some typical remote monitoring system may provide a service that enables a subscriber to watch activities in a target area from a remote location. Particularly, a home monitoring system may control a video phone installed at a home to transmit a message with a callback uniform resource locator (URL) to a subscriber's registered user terminal and the subscriber's registered user terminal is connected to a camera installed at the home through the callback URL. Some typical remote monitoring systems may transmit real-time monitoring information to a registered user terminal of a subscriber at a remote location. However, there are many restrictions and limitation in remote monitoring systems.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, monitoring information may be forwarded to any user terminal from a related service server by using one of subscriber's user terminals.

In accordance with another aspect of the present embodiment, monitoring information may be forwarded to a designated user terminal using one of subscriber's registered user terminals while the subscriber is using the same one to have a conversation with a person having the designated user terminal.

In accordance with still another aspect of the present embodiment, monitoring information may be forwarded to a designated user terminal by using one of subscriber's registered user terminals while the subscriber is using the same one to have a conversation with other person.

In accordance with still another aspect of the present embodiment, monitoring information may be forwarded to a designated user terminal using one of subscriber's registered user terminals while the subscriber is using the other one to have a conversation with other person.

In accordance with still another aspect of the present embodiment, monitoring information may be continuously forwarded to a designated user terminal by changing a user terminal to forward the monitoring information from one of subscriber's registered user terminals to the other.

In accordance with at least one embodiment, a method may be provided for providing a monitoring service to a user terminal at a server. The method may include receiving a data forward request message from a first one of subscriber's registered user terminals for forwarding target monitoring information to a designated user terminal, processing the target monitoring information to be processable at the designated user terminal, and transmitting a connection request message and the processed target monitoring information to the first one of subscriber's registered user terminals. The first one of subscriber's registered user terminals may receive the connection request message and the processed target monitoring information from the server and forward the processed target monitoring information to the designated user terminal in response to the request message. The subscriber's registered user terminals may be user terminals belonging to a subscriber of the monitoring service, registered at the server for the monitoring service, and installed with an application dedicatedly programmed for receiving the monitoring service. The designated user terminal may be a user terminal not registered at the server for the monitoring service and not installed with the application dedicatedly programmed for the monitoring service.

The data forward request message may include first information on the designated user terminal, second information on the target monitoring information, and third information on a data forward user terminal to be used for forwarding the target monitoring information to the designated user terminal. The data forward user terminal may be one of the subscriber's registered user terminals.

The second information may include a data type of the target monitoring information to be forwarded and a forwarding period including a forwarding start time and a forwarding end time.

The processing the target monitoring information may include determining the designated user terminal based on information included in the received request message, determining hardware and software specifications of the designated user terminal based on information included in the received request message, obtaining the target monitoring information from monitoring information stored in a container after collected from devices that are installed around the target area and monitor activities and incidents occurring at the target area, and processing the obtained target monitoring information to be processable at the designated user terminal based on the determined hardware and software specifications of the designated user terminal.

The obtaining the target monitoring information may include determining a forwarding start time and a forwarding end time of the target monitoring information based on the information included in the received data forward request message, retrieving the target monitoring information collected and stored from the forwarding start time until the forwarding end time, and transmitting the retrieved target monitoring information to the first one of subscriber's registered user terminal until the forwarding end time.

The transmitting may include determining a data forward user terminal among the subscriber's registered user terminals based on the received data forward request information, generating the connection request message including the processed target monitoring information, and transmitting the generated connection request message to the determined data forward user terminal. The determined data forward user terminal may be the first one of subscriber's registered user terminals. The determined data forward user terminal may be a second one of subscriber's registered user terminals and the second one is different from the first one.

The method may include receiving a second data forward request message from the first one of subscriber's registered user terminal, transmitting a request acceptance message to the first one, and transmitting a second connection request message and the processed target monitoring information to the second one of subscriber's registered user terminals. The first one may release communication connection established to the designated user terminal. The second one may establish communication connection to the designated user terminal in response to the second connection request message and continuously forward the processed target monitoring information to the designated user terminal.

In accordance with at least one embodiment, a method of a first one of subscriber's registered user terminal may be provided for forwarding target monitoring information to a designated user terminal. The method may include receiving a connection request message with target monitoring information from a server of providing a monitoring service, determining the designated user terminal based on the connection request message, and forwarding the received target monitoring information to the designated user terminal. The received target monitoring information may be processed by the server to be processable at the designated user terminal.

The method may include obtaining data forward information, generating a data forward request message including the obtained data forward information, and transmitting the generated data forward request message to the server.

Prior to the receiving the connection request message, the method may include establishing a communication connection to the designated user terminal for one of a voice call and a video call. The first one may forward the target monitoring information to the designated user terminal through the established communication connection.

After the forwarding the received target monitoring information to the designated user terminal, the method may include receiving a request acceptance message from the server and releasing the established communication connection to the designated user terminal. In this case, the request acceptance message may be generated and transmitted after the server receives a second data forward request message for changing a data forward user terminal from the first one to a second one of the subscriber's registered user terminals.

In accordance with at least one embodiment, a user terminal may be provide for forwarding target monitoring information to a designated user terminal. The user terminal may be configured to receive a connection request message with target monitoring information from a server of providing a monitoring service, determine the designated user terminal based on the connection request message, and forward the received target monitoring information to the designated user terminal. The received target monitoring information may be processed by the server to be processable at the designated user terminal.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 5 illustrates a method of providing a monitoring service to user terminals regardless of whether the user terminals are registered or not registered for the monitoring service and whether the user terminals are installed or not installed with an associated application for the monitoring service in accordance with at least one embodiment of the present invention; and FIG. 6 illustrates session information in accordance with at least one embodiment of the present invention.

DESCRIPTION OF EMBODIMENTS

Figure 1:
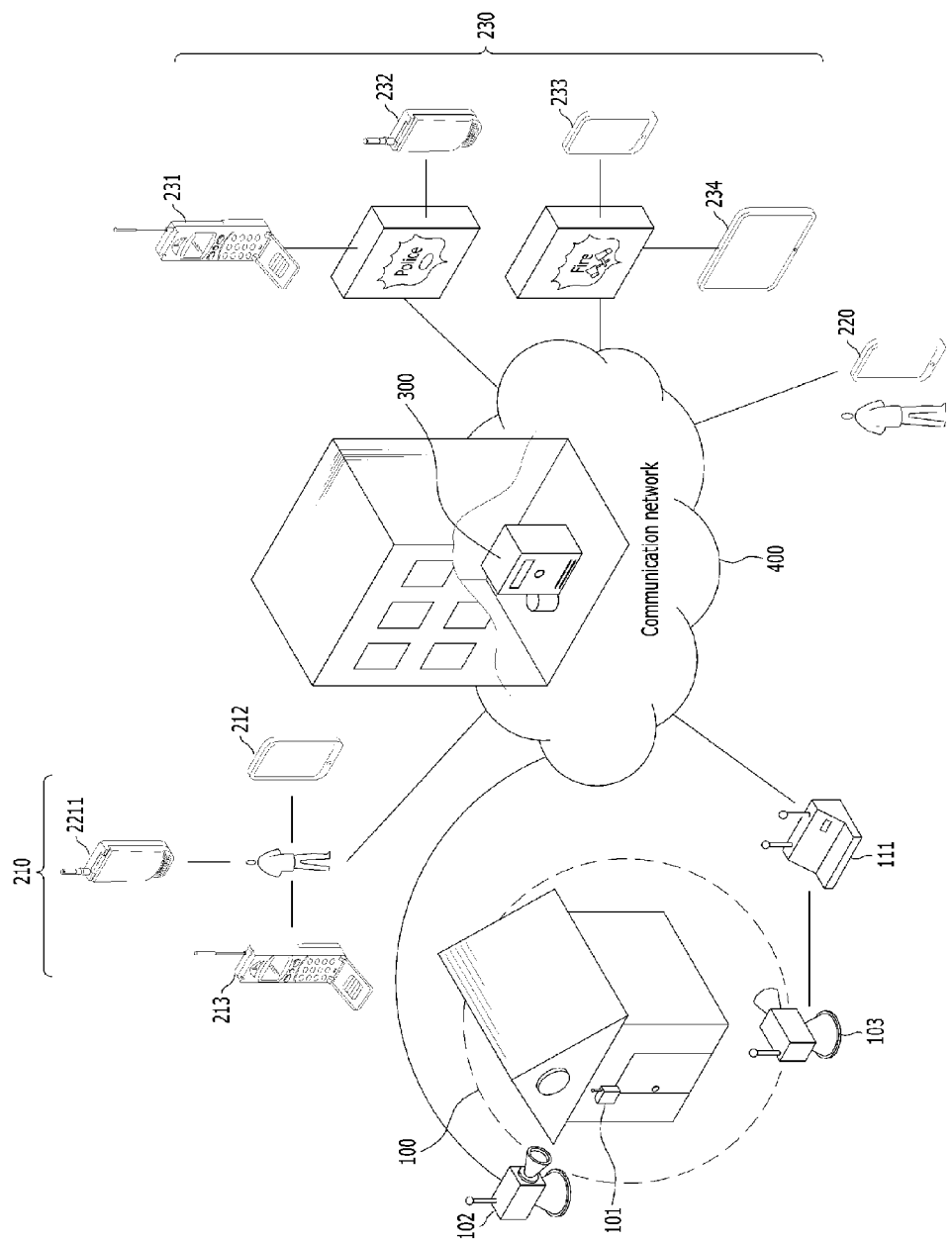
FIG. 1 illustrates a monitoring system for providing a monitoring service to user terminals regardless of whether the user terminals are registered or not registered for the monitoring service and whether the user terminals are installed or not installed with an associated application for the monitoring service in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a server may collect information on monitoring a target area from devices installed at the target area and provide monitoring information, as a part of a monitoring service, to user terminals regardless of whether the user terminals are registered or unregistered for the monitoring service and whether the user terminals have a required network application or a required M2M application installed or uninstalled. In order to provide such a monitoring service, the server may process target monitoring information to forward a designated user terminal to be processable at the designated user terminal and at least one subscriber's registered user terminals may forward the processed monitoring information from the server to the designated user terminal. Such a monitoring information forward procedure may be performed in various manners in accordance with at least one embodiment. For example, the monitoring information may be forwarded to a designated user terminal using one of subscriber's registered user terminals while the subscriber is using the same one to have a conversation with a person having the designated user terminal. The monitoring information may be forwarded to a designated user terminal by using one of subscriber's registered user terminals while the subscriber is using the same one to have a conversation with other person. The monitoring information may be forwarded to a designated user terminal using one of subscriber's registered user terminals while the subscriber is using the other one to have a conversation with other person. The monitoring information may be continuously forwarded to a designated user terminal by changing a user terminal to forward the monitoring information from one of subscriber's registered user terminals to the other. Hereinafter, such operation for forwarding predetermined monitoring information to any desired user terminal using at least one of subscriber's registered user terminals will be described in detail with reference to FIG. 1.

FIG. 1 illustrates a monitoring system for forwarding monitoring information to any user terminal using at least one of subscriber's user terminals in accordance with at least one embodiment of the present invention.

Referring to FIG. 1, monitoring system 100 may monitor activities or incidents occurring at target area 100 and provide monitoring information, as a part of a monitoring service, to desired user terminals whether the desired user terminals are registered or unregistered for the monitoring service or whether the desired user terminals are installed or not installed with a required network application or a required M2M application for the monitoring service in accordance with at least one embodiment. Particularly, monitoring system 100 may process target monitoring information to be processable at the desired user terminals and forward the target monitoring information to the desired user terminals using at least one of subscriber's registered user terminals in accordance with at least one embodiment. Such monitoring system 100 may be a machine to machine (M2M) system that communicates and performs associated operations based on a M2M protocol, but the present invention is not limited thereto. Such monitoring system 100 may include devices 101 to 103, subscriber's registered user terminals 210, and server 300. Monitoring system 100 may further include gateway 111 and communication network 400 for connecting devices 101 to 103, server 300, subscriber's registered user terminals 210, and designated user terminals 230.

Server 300, devices 101 to 103, gateway 111, and subscriber's user terminals 210 may communicate with each other through communication network 400 based on various types of communication protocols. Communication network 400 may be a mobile communication network or an Internet protocol (IP) network. For instance, communication network 400 may be 3$^{rd}$ generation mobile network, wideband code division multiple access (WCDMA) network, 4$^{th}$ generation mobile network, or long term evolution (LTE) network, but the present invention is not limited thereto. Devices 101-103 and gateway 111 may be coupled each other through a physical cable and communicate with each other based on serial communication. Furthermore, devices 101-103 and gateway 111 may be coupled through a wireless link and communication with each other based on short range communication, for example, Bluetooth, Zigbee, or near field communication (NFC).

Devices 101 to 103, gateway 111, subscriber's user terminals 210, and server 300 may have an associated network application or a M2M application in order to cooperate with each other based on a M2M protocol. In addition, devices 101 to 103, gateway 111, subscriber's user terminals 210, and server 300, may commonly employ a service capability layer (SCL) for general control of M2M communication and for storing and managing information for authentication and communication among other parties in M2M communication. Subscriber's user terminals 210 may employ a gateway service capability layer (GSCL) for forwarding monitoring information to designated user terminal 230.

Devices 101-103 may be deployed at around target area 100. Such devices 101-103 may sense activities and incidents occurring in target area 100 and provide such sensing results to server 300 as monitoring information on target area 100. Such sensing results may be context information on target area 100. Target area 100 may be various places to be monitored. For example, target area 100 may be home, an office unit, or an entire building. Devices 101 to 103 may be any devices capable of sensing activities and incidents occurring at target area 100 and communicating with other parties including server 300 and neighbor devices. For example, devices 101 to 103 may include a closed-circuit television (CCTV), a security camera, a motion sensor, a fire detector, a gas detector, a temperature sensor, a humidity sensor, a pressure sensor, a gyro sensor, a velocity sensor, and so forth. Devices 101 to 103 may be referred to as M2M devices, but the present invention is not limited.

Such devices 101 to 103 may be used for sensing various activities such as intrusion, illegal entry, fire, abnormal temperature or humidity, flood, and so forth. In order to sense such activities, devices 110 may collect context information of target area 100. For example, a security camera (e.g., devices 102 and 103) captures images of activities in target area 100 or a motion sensor (e.g., device 101) senses motions in target area 100. After collecting such context information, devices 101 to 103 transmits the collected context information to server 300 through communication network 400. Furthermore, devices 101 to 103 may transmit the collected context information to server 300 directly or indirectly through gateway 111.

Server 300 may be coupled to devices 101 to 103 through communication network 400 and receive context information of target area 100, as monitoring information, from devices 101 to 103. Such server 300 may be a M2M network service capability layer (NSCL), but the present invention is not limited thereto. Server 300 may manage and process the context information and stores the context information in container 311 as monitoring information with supplementary information such as a time of collecting the context information, an associated device, an associated subscriber, and so forth. Server 300 may provide a monitoring service not only to registered user terminals of subscribers but also to unregistered user terminals by managing and processing the monitoring information stored in container 311.

The monitoring service may enable subscribers to monitor a corresponding target area. For example, server 300 analyzes the context information collected from devices 101 to 103, detects certain activities or incidents occurring in target area 100 based on the analysis result, and informs subscribers of the detected activities or incidents. As a part of the monitoring service, server 300 may transmit the monitoring information to registered user terminals 210. The monitoring information may be a live view of target area 100 or a simple warning message for notifying a detected activity to a subscriber. Accordingly, the monitoring information may include multimedia data such as audio, video, or text data.

In accordance with at least one embodiment, server 300 may process the monitoring information to be processable at a designated user terminal and control at least one of subscriber's user terminals 210 to forward the processed monitoring information to the designated user terminal. In this way, the monitoring service may be provided to a user terminal regardless of whether an associated network application or an associated M2M application is installed therein. For example, server 300 may i) determine and retrieve target monitoring information to be forwarded from container 311, ii) determine designated user terminal 230 where the target monitoring information is forwarded to, and iii) determine at least one of subscriber's registered user terminals 210 to be used for forwarding the target monitoring information to designated user terminal 230 in response to a data forward request message or a session transfer request message from at least one of subscriber's user terminals 210.

Based on the determination results, server 300 may i) obtain requested monitoring information from container 311, ii) process the obtained monitoring information to be processable at designated user terminal 230, and iii) provide the processed monitoring information to the determined one of subscriber's registered user terminals 210 in accordance with at least one embodiment. Since server 300 obtains monitoring information based on the determination result, server 300 can provide monitoring information in any time period, not just monitoring information currently collected from a time of requesting. For example, server 300 may retrieve monitoring information from a start time T until an end time t or for a time duration t. Furthermore, since server 300 processes the obtained monitoring information to be processable at designated user terminal 210, such designated user terminal 210 is not required to have an associated network application or an associated M2M application installed therein. Such operations of server 300 will be described in detail with reference to FIG. 3.

Subscriber's user terminals 210 may be registered at server 300 and used for the monitoring service in connection with server 300. For, subscriber's user terminals 210 may receive monitoring information, as a part of the monitoring service, from server 300 and enable a corresponding subscriber to monitor target area 100. Accordingly, subscriber's user terminals 210 may be devices capable of communication through various types of networks and interaction with an internetwork multimedia subsystem (IMS) platform. For example, subscriber's user terminals 210 may be required to access a base station or an access point for communication through a mobile communication network or an IP network. Furthermore, subscriber's user terminals 210 may be required to have a predetermined application program such as a network application or a M2M application for the monitoring service. Particularly, a predetermined service application may be downloaded from server 300 and installed at subscribers' user terminals 210 for the monitoring service in accordance with at least one embodiment. Such requirements may not be applied to designated user terminal 230. That is, the monitoring information may be forwarded to and output at designated user terminal 230 without a predetermined service application installed therein in accordance with at least one embodiment. For example, subscriber's user terminals 210 may include a smart phone, a pad-type device, a personal computer (PC), a tablet PC, a laptop PC, personal data assistance (PDA), a personal multimedia player (PMP), and so forth.

As described, at least one of subscriber's registered user terminals 210 may be used to forward monitoring information to designated user terminals 230 in accordance with at least one embodiment. In order to forward such monitoring information, subscriber's registered user terminals 210 may i) receive data forward information or session transfer information from a subscriber, ii) generate and transmit a data forward request message or a session transfer request message to server 300, iii) receive, from server 300, target monitoring information processed according to specifications of designated user terminals 230, and iv) forward the processed monitoring information designated user terminals 230. Such operation of subscriber's registered user terminals 210 will be described in detail with reference to FIG. 2.

Figure 2:
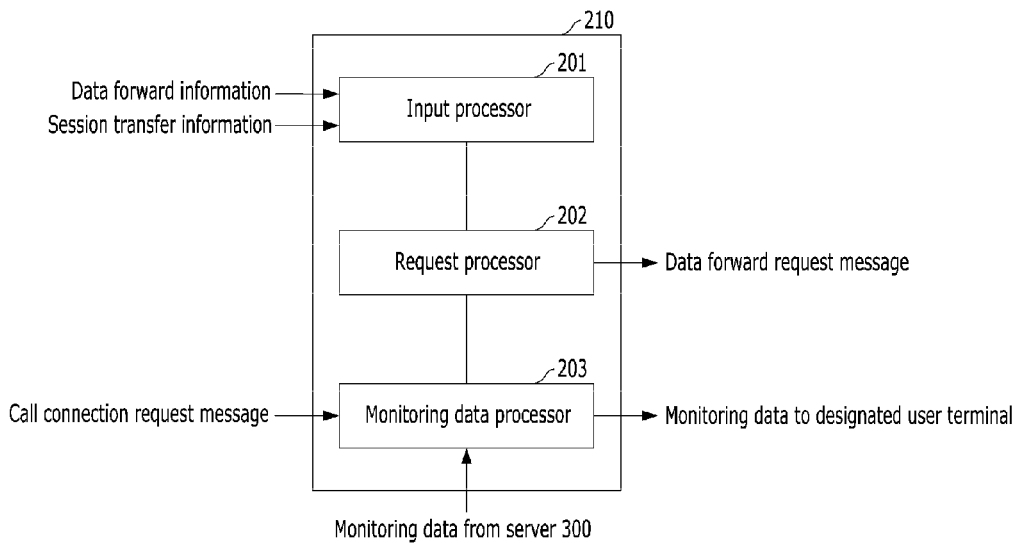
FIG. 2 illustrates a subscriber's registered user terminal in accordance with at least one embodiment of the present invention.

FIG. 2 illustrates a subscriber's registered user terminal in accordance with at least one embodiment of the present invention.

Referring to FIG. 2, user terminal 210 denotes a user terminal belonging to a subscriber for the monitoring service and registered at server 300 for the monitoring service. As described, such subscriber's registered user terminal 210 may forward the target monitoring information to a designated user terminal while user terminal 210 is being used for communicating with the same designated user terminal or other user terminal. In order to forward the target monitoring information, subscriber's registered user terminal 210 may perform a monitoring information forward procedure and a session transfer procedure and include input processor 201, request processor 202, and monitoring data processor 203 in order to forward target monitoring information to a designated user terminal. Hereinafter, such constituent elements of user terminal 210 will be described. The constituent elements of user terminal 210 will be also described in detail with reference to FIG. 4A, FIG. 4B, and FIG. 5.

Input processor 201 may receive and process information for the monitoring information forward procedure and the session transfer procedure. For example, upon the initiation of the monitoring information forward procedure and the session transfer procedure, input processor 210 may receive data forward information or session transfer information from a subscriber through a predetermined user interface displayed on a screen of user terminal 210 or through predetermined input devices of user terminal 210. Such operation may be performed while subscriber's registered user terminal 210 is used to communicate with a desired person having user terminal 230. Such communication may be a voice call or a video call.

Particularly, the data forward information is entered for the monitoring information forward procedure and the session transfer information is entered for the session transfer procedure. Although the data forward information is described differently from the session transfer information, the data forward information may be substantially similar to the session transfer information. The data forward information may be information required for forwarding target monitoring information to a designated user terminal using at least one of the subscriber's registered user terminals. For example, the data forward information may include i) information on target monitoring information to forward, ii) information on the designated user terminal, and iii) information on one of the subscriber's registered user terminal that will be used for forwarding the target monitoring information. The information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the data-forward information may include session information. The session information is information on a session established between user terminals. The session information may be obtained from user terminals associated with a corresponding session.

The session transfer procedure may change a user terminal forwarding target monitoring information from one of subscriber's registered user terminals to the other. Such procedure may be substantially similar to the monitoring information forwarding procedure so the session transfer information is also similar to the data forward information. For example, the session transfer information may include i) information on target monitoring information to forward, ii) information on the designated user terminal, and iii) information on one of the subscriber's registered user terminal that will be used for forwarding the target monitoring information. The information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the session transfer information may include session information. Such session information may be used to i) determine a designated user terminal, ii) determine a user terminal used to forward target monitoring information, iii) determine how to transcode the target monitoring information for the designated user terminal, and so forth. Particularly, when the subscriber wants to change a user terminal for forwarding the target monitoring information to designated user terminal 230 from the subscriber's first user terminal 211 to the subscriber's second user terminal 213, a call-ID of second user terminal 213 may be included in the session information of the session transfer information. That is, the subscriber may enter a call-ID of second user terminal 213 as the information on a user terminal for forwarding the target monitoring information. Such entered call-ID may be included in the session transfer information as a part of session information.

Request processor 202 may analyze the received data forward information and generate a data forward request message to include the received data forward information in order to request one of subscriber's registered user terminals to forward the monitoring information. Request processor 202 may transmit the generated data forward request message to server 300.

In addition, request processor 202 may analyze the received session transfer information and generate a session transfer request message in order to request one of subscriber's requested user terminals to continuously forward the monitoring information. Request processor 202 may transmit the generated session transfer request message to one of subscriber's registered user terminals, to be changed.

Monitoring data processor 203 may receive a call connection setup request message for set a call connection from server 300 in order to set up a call connection to designated user terminal 230. In response to the call connection setup request message, monitoring data processor 203 may set up a call connection to designated user terminal 230 based on information included in the call connection request message. Monitoring data processor 203 may receive processed monitoring information from server 300 and forward the received monitoring information to designated user terminal 230.

As described above, the target monitoring information may be forwarded to designated user terminal 230 through at least one of subscriber's registered user terminal 210. In order to forward target monitoring information to designated user terminal 230, server 300 may obtain target monitoring information from container 311, process the obtained information to be processable at designated user terminal 230, and transmit the processed information to at least one of subscriber's registered user terminal 210. Hereinafter, such operation will be described in detail with reference to FIG. 3.

Figure 3:
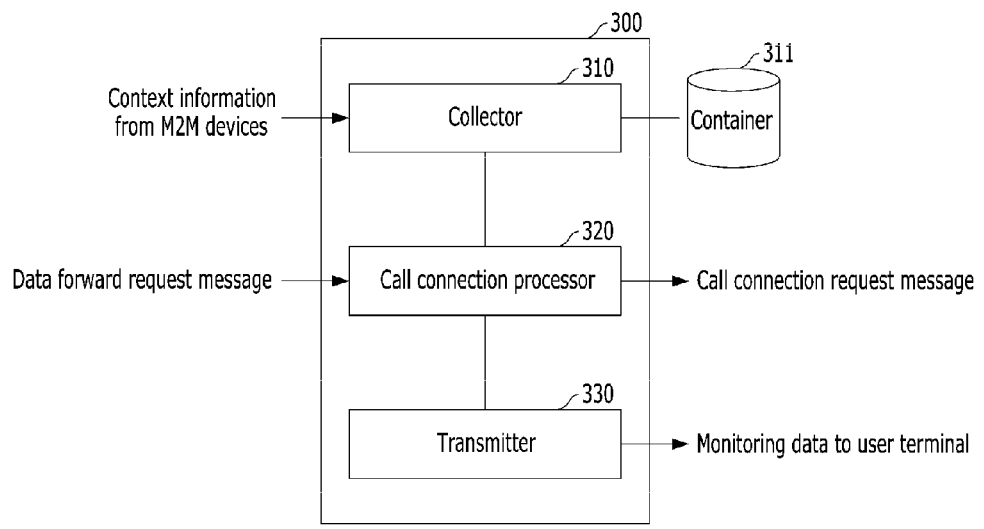
FIG. 3 illustrates a server for providing a monitoring service in accordance with at least one embodiment of the present invention.

FIG. 3 illustrates a server for providing a monitoring service in accordance with at least one embodiment of the present invention.

Referring to FIG. 3, server 300 may receive a data forward request message or a session transfer request message from at least one of subscriber's registered user terminals, obtain target monitoring information from container 311, process the obtained monitoring information, and provide the processed monitoring information to at least one of subscriber's registered user terminals. For performing such operation, server 300 may include collector 310, call connection processor 320, and transmitter 330. Hereinafter, such constituent elements of server 300 will be described. The constituent elements of server 300 will be also described in detail with reference to FIG. 4A, FIG. 4B, and FIG. 5.

Collector 310 may collect context information on activities and incidents occurring at target area 300 from devices 101 to 103 through communication network 400 and store the collected context information, as monitoring information, in container 311. Collector 310 may also store supplementary information associated with the collected context information, such as a time of collecting the context information from devices, device identifications associated with the collected context information, subscriber identifications associated with the collected context information, and so forth. Furthermore, container 311 may store analysis results of the collected context information, such as event information. The event information may be information on activities and incidents, such as intrusion, illegal entry, fire, abnormal temperature, flood, and so forth.

Call connection processor 320 receives a data forward request message and/or a session transfer request message from request processor 202 of user terminal 210. Upon the receipt of the data forward request message or the session transfer request message, call connection processor 320 may analyze data forward information or session transfer information included in the request messages and received from a subscriber and obtained from user terminals. Based on the analysis result, call connection processor 320 may determine a user terminal to be used for forwarding target monitoring information to a designated user terminal among subscriber's registered user terminals. Call connection processor 320 transmits a call connection setup request message to the determined user terminal.

Transmitter 330 may analyze the data forward information and the session transfer information included in the data forward request message and the session transfer request message and obtain monitoring information to be forwarded based on the analysis result. Transmitter 330 may transcode the obtained monitoring information to be processable at the designated user terminal based on the analysis result and transmit the transcoded monitoring information to the determined user terminal for forwarding the monitoring information.

As described, a monitoring service is provided to a user terminal regardless of whether the user terminal is registered at a server for the monitoring service and whether the user terminal is installed or not installed with an associated network application or M2M application for the monitoring service in accordance with at least one embodiment. In order to provide such monitoring service, a server may retrieve target monitoring information from a container and transcode the retrieved target monitoring information to be processable at a designated user terminal. Furthermore, at least one of subscriber's registered user terminals may forward the transcoded monitoring information to the designated user terminal. Accordingly, a subscriber might have several ways of sending monitoring information to a particular person (e.g., a police officer) while having a conversation with any person including the particular person. For example, when a subscriber owns and registers first and second user terminals at a server for a monitoring service, the subscriber can use the subscriber's first registered user terminal to forward monitoring information of a target area to a desired person's user terminal while using the same user terminal (i.e., the subscriber's first registered user terminal) to have a conversation with the desired person's user terminal or any other person. The subscriber also can use the subscriber's second registered user terminal to forward monitoring information to a desired person's user terminal while using a different user terminal (i.e., the subscriber's first registered user terminal) to have a conversation with the desired person's user terminal or any other person. Hereinafter, such operation will be described in detail with reference to FIG. 4A, FIG. 4B, and FIG. 5.

Figure 4A:
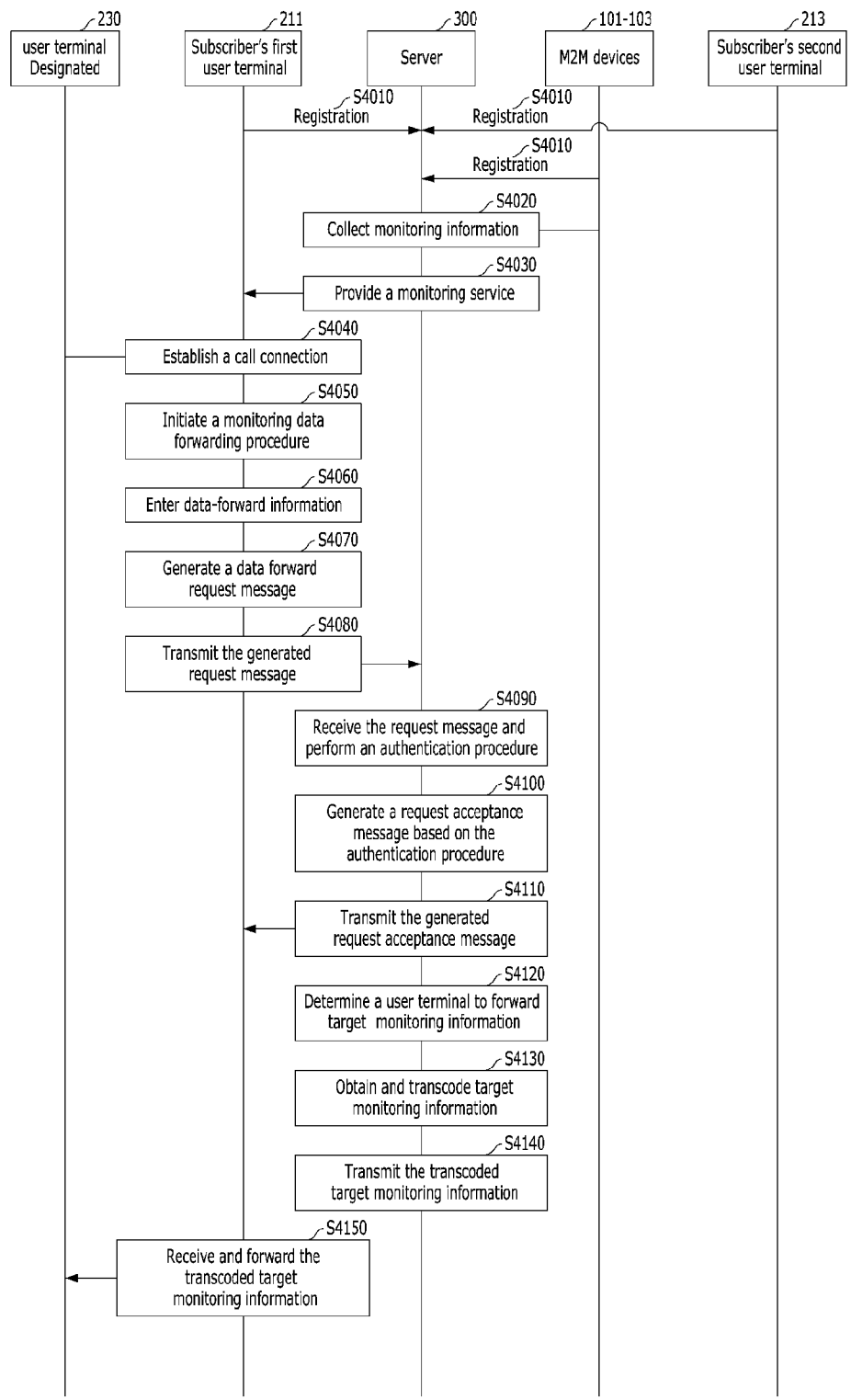
FIG. 4A and FIG. 4B illustrates a method of providing a monitoring service to user terminals regardless of whether the user terminals are registered or not registered for the monitoring service and whether the user terminals are installed or not installed with an associated application for the monitoring service in accordance with at least one embodiment of the present invention.
Figure 4B:
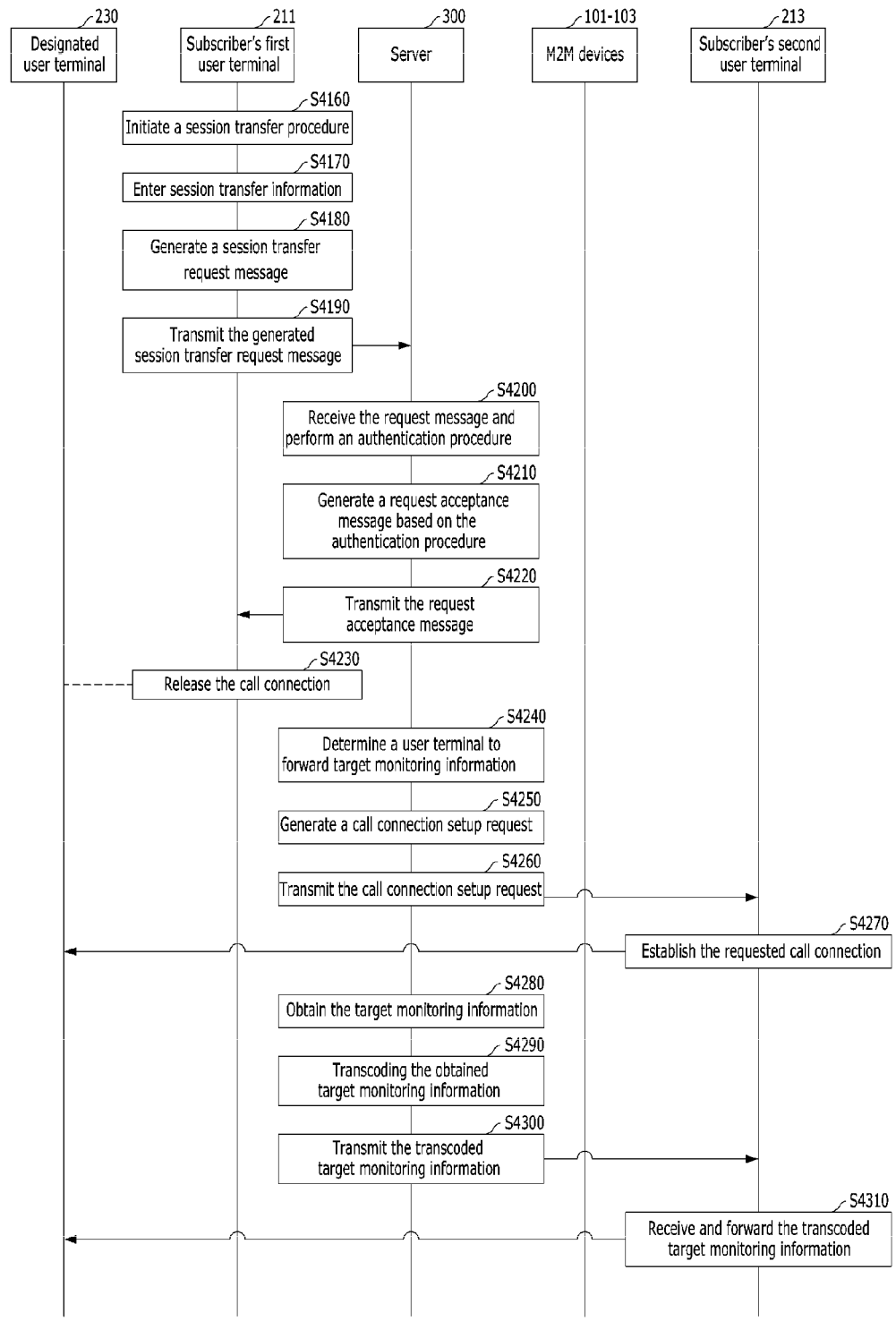

FIG. 4A and FIG. 4B illustrates a method of forwarding monitoring information of a target area to a designated user terminal using at least one of a service subscriber's registered user terminals in accordance with at least one embodiment of the present invention.

Referring to FIG. 4A, a subscriber of a monitoring service may register user terminals 211 and 213 and M2M devices 110 to 103 at server 300 when the subscriber subscribes to the monitoring service at step S4010. Registered user terminals 211 and 213 may be installed with M2M applications and/or network applications (NA) for the monitoring service.

Upon the registration, server 300 may communicate with M2M devices 101 to 103 and consistently collect context information of target area 100 from M2M devices 101 to 103 as monitoring information of target area 100 at step S4020.

For example, server 300 communicates with M2M devices 101 to 103 directly or indirectly through gateway 111. Through communication, collector 310 of server 300 may receive context information of target area 100 from M2M devices 101 to 103. Collector 310 of server 300 may store the received context information in container 311 as the monitoring information.

M2M devices 110 may be various types of devices (e.g., sensors) capable collecting information on activities occurring in target area 100. For example, M2M devices 100 may include a security camera, a temperature sensor, a motion sensor, a humidity sensor, and so forth. Accordingly, the context information on target area 100 may include captured still images, recorded sound, captured moving images, sensing results, and so forth.

As the monitoring information, container 311 of server 300 may store the collected context information. The monitoring information may include information on a time of obtaining the context information, digital multimedia data such as digital audio or video files, and sensing data such as a motion detection data, a temperature, and humidity. The monitoring information may further include information on events which may be determined based on the collected context information. Such events may include intrusion, illegal entry, abnormal temperature and humidity, fire, and so forth.

At step S4030, server 300 may analyze the collected monitoring information and provides the monitoring service, based on the analysis result, to the subscriber's primary user terminal among the registered user terminals 211 and 212. For the convenience of the description and ease of understanding, the monitoring service is described as being initially provided to the subscriber's primary user terminal (i.e., first user terminal 211), but the present invention is not limited thereto. For example, the monitoring service may be initially provided to all of the subscriber's user terminals 211 to 213.

The monitoring service may enable the subscriber to monitor activities or incidents occurring in target area 100 in various ways. For example, the monitoring service may transmit a predetermined warning message to the subscriber's primary user terminal when server 300 detects certain activities or incidents occurring in target area 100 based on the analysis result. The monitoring service may transmit live view of target area 100 to the subscriber's primary user terminal. The subscriber may be aware of certain activities or incidents occurring in target area 100, which need to response quickly while watching the live view of target area 100. Such activities or incidents may be fire, illegal entry, abnormal temperature and humidity, flood, and so forth.

At step S4040, a call connection may be established between first user terminal 211 as a primary user terminal and a designated user terminal (e.g., user terminal 230) upon a predetermined event. The call connection may include communication session established between two parties for voice communication, video communication, and/or data communication. The predetermined event may be the receipt of a warning message transmitted from server 300, which is generated when server 300 determines certain incidents occurs in target area 100 based on the analysis result. Or, the predetermined event may be call initiation by the subscriber. For example, when the subscriber finds certain incidents needing a quick response while watching live view of target area, the subscriber may make a call to a designated person such as a police officer or an emergency center. That is, such a call connection may be established by the subscriber making a call to the designated user terminal in response to the predetermined event such as the warning message. Alternatively, the call connection may be automatically established to the designated user terminal upon the predetermined event. The designated user terminal may be a terminal of a police station or a fire department, which is predetermined according to a type of incident occurring in target area 100. Furthermore, the call connection may be for at least one of a data call session, a voice call session, and a video call session. For example, the subscriber makes a voice call or a video call to a designated person and the subscriber's user terminal is coupled to the designated person's user terminal for a voice call or a video call.

After the call connection is established (S4040), a monitoring information forwarding procedure may be initiated at step S4050. In addition, an associated user interface may be displayed on first user terminal 211 upon the initiation of the monitoring information forwarding procedure at step S4050. For example, the subscriber might want to forward the monitoring information of target area 100, which shows activities or incidents occurring in target area 100, to designated user terminal 230 in order to clearly explain current incidents happening at target area 100. In this case, the subscriber invokes such a monitoring information forwarding procedure. There may be many ways to invoke the monitoring information forwarding procedure. For example, the subscriber may activate an associated application installed at first user terminal 211 while talking to a designated persons such as a police officer using subscriber's first registered user terminal 211.

At step S4060, the subscriber may enter data forward information into first user terminal 211 in order to forward the predetermined monitoring information to designated user terminal 230. For example, the associated user interface of the monitoring information forwarding procedure may request the subscriber to enter the data forward information through input processor 201 of first user terminal 211. In response to such request, the subscriber enters data forward information through input processor 201 of first user terminal 211. Such monitoring information forwarding procedure may be a part of the monitoring service and display an associated user interface on a display of first user terminal 211 for interacting with the subscriber, but the present invention is not limited thereto.

The data forward information may be information required for forwarding target monitoring information to a designated user terminal using at least one of the subscriber's registered user terminals. For example, the data forward information may include i) information on target monitoring information to forward, ii) information on the designated user terminal, and iii) information on one of the subscriber's registered user terminal that will be used for forwarding the target monitoring information. Among the data forward information, the subscriber may be required to enter the information on target monitoring information. The information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the data forward information may include session information. The session information is information on a session established between user terminals. Accordingly, the session information may be obtained from user terminals associated with a corresponding session.

That is, the session information may be information required to set up a call. Such session information is illustrated in FIG. 6. As shown in FIG. 6, session information 600 may include: a) public user identity (PUID 601) of each user terminal; b) call identifier (call-ID 602) of a user terminal used to forward the target monitoring information; c) supported media and codec (SDP 603); d) information on resolutions supported by a user terminal (capability 604); e) information on whether a short message service (SMS) or multimedia message service (MMS) is supported (SMS/MMS 605); and f) information on a model number of each user terminal (Model code 606). As the PUID, a telephone uniform resource identifier (Tel-URI) or a session initiation protocol uniform resource identifier (SIP-URI) may be included in session information 600.

Such session information may be used to i) determine a designated user terminal, ii) determine a user terminal used to forward target monitoring information, and iii) determine how to transcode the target monitoring information to be processable at the designated user terminal. Particularly, call-ID 602 may be used to determine a user terminal to be used for forwarding target monitoring information. For example, when the subscriber wants to forward the target monitoring information to designated user terminal 230 using the subscriber's second user terminal 213, a call-ID of second user terminal 213 may be included in the data forward request message.

The session information is described as including six different types 601 to 606 of information in FIG. 6, but the present invention is not limited thereto. The session information may include parts of information shown in FIG. 6 or more information as well.

At step S4070, first user terminal 211 (i.e., the subscriber's primary user terminal) may generate a data forward request message based on the data forward information. For example, request processor 202 may analyze the data forward information. Based on the analysis result, processor 202 may determine a designated user terminal, target monitoring information to forward, and a user terminal to forward the target monitoring information. Request processor 202 may generate a data forward request message to include entire or a part of the data forward information. For example, the data forward request message may include the information on target monitoring information and the session information. As described, the information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the data forward request message may include the session information.

At step S4080, first user terminal 211 may transmit the generated data forward request message to server 300. At step S4090, server 300 may receive the data forward request message from first user terminal 211 and perform an associated authentication procedure. At step S4100, call connection processor 320 of server 300 may generate a request acceptance message in response to the data forward request message after performing the authentication procedure. At step S4110, call connection processor 320 of server 300 may transmit the request acceptance message to the subscriber's first user terminal 211.

At step S4120, server 300 may determine a user terminal to be used for forwarding the target monitoring information based on the received data forward request message. Server 300 may analyze the session information included in the data forward request message to determine a user terminal to forward the target monitoring information. For example, server 300 determines whether call-ID information is included in the session information of the data forward request message. When the call-ID information is included, server 300 determines a user terminal associated with the call-ID information as a user terminal to forward the target monitoring information. Furthermore, when the call-ID information is not included, server 300 determines a user terminal (i.e., user terminal 211) that initiated a call to a designated user terminal (i.e., user terminal 230) or that is coupled to a designated user terminal (i.e., user terminal 230), as a user terminal to forward the target monitoring information. The present invention is not limited thereto. The subscriber may select one of registered user terminals through interaction with as associated user interface displayed on user terminal 211.

At step S4130, server 300 may obtain target monitoring information and transcode the obtained target monitoring information based on information included in the received data forward request message. For example, server 300 determines a data type of target monitoring information D to forward and a forwarding period T, t thereof based on the information in the data forward request message. Server 300 retrieves the target monitoring information from container 311 based on the determination result. In addition, server 300 determines hardware or soft specifications of designated user terminal 230 based on the session information included in the received data forward request message. Based on the session information, server 300 determines supported display resolutions of designated user terminal 230, whether SMS/MMS is supported, and so forth. Based on the determination result, server 300 transcode the obtained target monitoring information to be processable at designated user terminal 230.

At step S4140, server 300 may provide the transcoded target monitoring information to subscriber's first user terminal 211. At step S4150, first user terminal 211 may receive transcoded target monitoring information from server 300 and continuously forward the transcoded target monitoring information to designated user terminal 230. For example, second user terminal 213 may forward the transcoded target monitoring from a forwarding start time T until a forwarding end time for a forwarding duration t.

As described, while the subscriber's first user terminal 211 is being coupled to designated user terminal 230 for a voice call or a video call, designated user terminal 230 simultaneously receives and output the transcoded monitoring information that the subscriber wants to show to a related person such as a police officer or a fire fighter. Accordingly, the monitoring information can be forwarded to and outputted at a user terminal not installed with a network application or a M2M application for the monitoring service. Furthermore, the subscriber can conveniently and clearly explain or show activities or incidents at target area 100 to a desired person such as a police officer or a fire fighter.

Such target monitoring information may be output at the subscriber's first user terminal 211 and designated user terminal 230 in various manners. For example, the target monitoring information may include video data and audio data. In this case, the target monitoring information may be displayed on entire of a part of a display area of the subscriber's user terminal 211 and/or designated user terminal 230. Alternatively, the target monitoring information may be displayed as a SMS message or a MMS message on a part of display area of user terminals 211 and 230. In addition, audio data included in the target monitoring information may be output through a speaker of user terminals 211 and 230. If the target monitoring information is in a certain data format, a corresponding application may be automatically initiated and display the target monitoring information through an associated window displayed on a part of a display area of user terminals 211 and 230.

While forwarding the target monitoring information through the subscriber's first user terminal 211, the subscriber might want to use another user terminal to forward the target monitoring information to designated user terminal 230. The subscriber might have many different reasons for this. For example, the subscriber's first user terminal has a low battery level or is in a shadow area. The subscriber may want to make a call to another person while sending the target monitoring information to designated user terminal 230. In accordance with at least one embodiment, a session transfer procedure may be performed to control the subscriber's second user terminal 213 to forward the target monitoring information to designated user terminal 230. Hereinafter, such operation will be described in detail with reference to FIG. 4B.

Referring to FIG. 4B, when the subscriber wants to use the subscriber's second user terminal 213 instead of using the subscriber first user terminal 211, the subscriber may initiate a session transfer procedure at the subscriber's first user terminal 213 at step S4160. For example, the subscriber activates an associated application installed at first user terminal 211 while the subscriber is using first user terminal 211 for communicating with designated user terminal 230 and for forwarding the target monitoring information to designated user terminal 230 at the same time. Upon the activation of the associated application, an associated user interface may be displayed on first user terminal 21. For the convenience of the description and ease of understanding, the session transfer procedure is described differently from the monitoring information forwarding procedure. However, the session transfer procedure may substantially perform operations similar to those of the monitoring information forwarding procedure. For example, when a subscriber wants to change a subscriber's user terminal for forwarding monitoring information to a designated user terminal from a first user terminal to a second user terminal, such operation may be achieved by performing the monitoring information forwarding procedure again.

At step S4170, the subscriber may enter session transfer information to first user terminal 211 to change a user terminal for forwarding the monitoring information to designated user terminal 230 from first user terminal 211 to second user terminal 213. For example, the associated user interface of the session transfer procedure may request the subscriber to enter the session transfer information through input processor 201 of first user terminal 211. In response to such request, the subscriber enters the requested session transfer information through input processor 201 of first user terminal 211. The session transfer procedure may be a part of the monitoring service and display an associated user interface on a display of first user terminal 211 for interacting with the subscriber, but the present invention is not limited thereto.

The session transfer information may be information required for changing a user terminal to forward target monitoring information to a designated user terminal from one to the other. The session transfer information may be substantially similar to the data forward information. For example, the session transfer information may include i) information on target monitoring information to forward, ii) information on the designated user terminal, and iii) information on one of the subscriber's registered user terminal that will be used for forwarding the target monitoring information. The information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the session transfer information may include session information. Such session information may be used to i) determine a designated user terminal, ii) determine a user terminal used to forward target monitoring information, iii) determine how to transcode the target monitoring information for the designated user terminal, and so forth. Particularly, when the subscriber wants to change a user terminal for forwarding the target monitoring information to designated user terminal 230 from the subscriber's first user terminal 211 to the subscriber's second user terminal 213, a call-ID of second user terminal 213 may be included in the session information of the session transfer information. That is, the subscriber may enter a call-ID of second user terminal 213 as the information on a user terminal for forwarding the target monitoring information. Such entered call-ID may be included in the session transfer information as a part of session information. Since the session transfer information is similar to the data forward information and the data forward information is already described above, the detailed description thereof will be omitted herein.

At step S4180, first user terminal 211 may generate a session transfer request message based on the session transfer information. For example, request processor 202 may analyze the session transfer information. Based on the analysis result, request processor 202 may determine a user terminal to be changed for forwarding the target monitoring information. In addition, request processor 202 may determine a designated user terminal and target monitoring information to forward. Request processor 202 may generate a session transfer request message to include entire or a part of the session transfer information. For example, the session transfer request message may include the information on target monitoring information and the session information. As described, the information on target monitoring information may include i) a data type of target monitoring information D to forward and ii) a forwarding period (e.g., a forwarding start time T and a forwarding end time or a forwarding duration t). As the information on a user terminal to be changed to forward the target monitoring information, the session transfer request message may include a call-ID of subscriber's second user terminal 213 as a part of the session information.

At step S4190, request processor 202 of first user terminal 211 may transmit the generated session transfer request message to server 300. At step S4200, server 300 may receive the session transfer request message from first user terminal 211 and perform an associated authentication procedure. At step S4210, call connection processor 320 of server 300 may generate a request acceptance message in response to the session transfer request message after performing the authentication procedure. At step S4220, call connection processor 320 of server 300 may transmit the request acceptance message to the subscriber's first user terminal 211.

At step S4230, first user terminal 211 may releases the previously established call connection in response to the request acceptance message. For example, the subscriber hangs up the call to designated user terminal 230 after the subscriber confirms that the session transfer request is approved by server 300. By doing so, the subscriber can use first user terminal 211 for another purpose, such as making a call to other persons, changing a battery thereof, and so forth.

At step S4240, server 300 may determine a user terminal to be changed for continuously forwarding the target monitoring information based on the received session transfer request message. Server 300 may analyze the session information included in the session transfer request message to determine a user terminal to be changed for continuously forwarding the target monitoring information. For example, server 300 extracts call-ID information from the session information of the session transfer request message and determines a user terminal associated with the extracted call-ID as the user terminal to be changed for continuously forwarding the target monitoring information to designated user terminal 230.

At step S4250, server 300 may generate a call connection setup request message based on the session transfer information including the information on the target monitoring information (a data type D and a forwarding period T, t) and the session information. At step S4260, server 300 may transmit the generated call connection setup request message to the determined user terminal to be changed for continuously forwarding the target monitoring information, for example, the subscriber's second user terminal 213.

At step S4270, second user terminal 213 may establish the requested call connection to designated user terminal 230 based on the session information included in the call connection setup request message. As described, the call connection may include communication session established between two parties for voice communication, video communication, and data communication. For example, second user terminal 213 determines a designated user terminal based on the session information included in the call connection setup request message and establishes a call connection to the determined designated user terminal, for example, designated user terminal 230.

At step S4280, server 300 may continuously obtain the target monitoring information from container 311 based on the session transfer information. At step S4290, server 300 may transcode the obtained target monitoring information based on information included in the received session transfer request message. For example, server 300 determines a data type of target monitoring information D to forward and a forwarding period T, t thereof based on the information in the session transfer request message. Server 300 retrieves the target monitoring information from container 311 based on the determination result. In addition, server 300 determines hardware or soft specifications of designated user terminal 230 based on the session information included in the received session transfer request message. Based on the session information, server 300 determines supported display resolutions of designated user terminal 230, whether SMS/MMS is supported, and so forth. Based on the determination result, server 300 transcodes the obtained target monitoring information to be processable at designated user terminal 230. At step S4300, server 300 may provide the transcoded target monitoring information to the subscriber's second user terminal 213.

Although the steps S4280 to S4300 are described as being performed sequentially after the establishing a call connection (S4270), the present invention is not limited thereto. Such steps S4280 to S4300 may be continuously performed after releasing the previous call connection between designated user terminal 230 and subscriber's first user terminal 21. Particularly, steps S4280 to S4300 may be performed in parallel with other steps.

At step S4310, the subscriber's second user terminal 213 may receive transcoded target monitoring information from server 300 and forward the transcoded target monitoring information to designated user terminal 230. For example, second user terminal 213 forwards the transcoded target monitoring from a forwarding start time T until a forwarding end time for a forwarding duration t.

As described, since the call connection between first user terminal 211 and designated user terminal 230, the subscriber can make a call to other person using first user terminal 211 while transmitting the target monitoring information to designated user terminal 230 through the subscriber's second user terminal 213.

While the subscriber's second user terminal 213 is being coupled to designated user terminal 230 for a voice call and/or a video call (e.g., voice call session and/or data call session), designated user terminal 230 simultaneously receives and output the target monitoring information that the subscriber wants to show to a related person such as a police officer 230. Such target monitoring information may be simultaneously output at the subscriber's first user terminal 211 and designated user terminal 230 in various manners. For example, the target monitoring information may include video data and audio data. In this case, the target monitoring information may be displayed on entire of a part of a display area of the subscriber's user terminal 213 and/or designated user terminal 230. Alternatively, the target monitoring information may be displayed as a SMS message or a MMS message on a part of display area of user terminals 213 and 230. In addition, audio data included in the target monitoring information may be output through a speaker of user terminals 213 and 230. If the target monitoring information is in a certain data format, a corresponding application may be automatically initiated and display the target monitoring information through an associated window displayed on a part of a display area of user terminals 213 and 230. That is, second user terminal 213 may transmit the target monitoring information to designated user terminal 230 while outputting the target monitoring information through related constituent elements of second user terminal 213.

In FIG. 4A and FIG. 4B, the subscriber uses first user terminal 211 to communicate with and to simultaneously forward the target monitoring information to designated user terminal 230. Alternatively, the subscriber uses first user terminal 211 to communication with other person and uses second user terminal 213 to forward the target monitoring information to designated user terminal 230. In accordance with another embodiment, the subscriber is enabled to use first user terminal 211 to communication with designated user terminal 230 and to use second user terminal 213 to forward the target monitoring information to the same designated user terminal 230 at the same time. Such operation will be described in detail with reference to FIG. 5.

FIG. 5 illustrates a method of forwarding monitoring information of a target area to a designated user terminal using one of a service subscriber's registered user terminals while communicating with the same designated user terminal using the other user terminal in accordance with at least one embodiment of the present invention.

Referring to FIG. 5, a subscriber of a monitoring service may register user terminals 211 and 213 and M2M devices 110 to 103 at server 300 when the subscriber subscribes to the monitoring service at step S5010. Registered user terminals 211 and 213 may be installed with M2M applications and/or network applications (NA) for the monitoring service. As described, designated user terminal 230 may be a user terminal of a designated person or a designated organization, such as a police officer or a police station and a fire fighter or a fire station.

Upon the registration, server 300 may communicate with M2M devices 101 to 103 and consistently collect context information of target area 100 from M2M devices 101 to 103 as a monitoring result of target area 100 at step S5020. For example, server 300 communicates with M2M devices 101 to 103 directly or indirectly through gateway 111. Through communication, collector 310 of server 300 receives context information of target area 100 from M2M devices 101 to 103. Collector 310 of server 300 stores the received context information in container 311 as the monitoring information.

At step S5030, server 300 may analyze the collected monitoring information and provide the monitoring service, based on the analysis result, to the subscriber's primary user terminal among the registered user terminals 211 and 212. For the convenience of the description and ease of understanding, the monitoring service is described as being initially provided to the subscriber's primary user terminal (i.e., first user terminal 211), but the present invention is not limited thereto. For example, the monitoring service may be initially provided to all of the subscriber's user terminals 211 to 213 at the same time.

At step S5040, a call connection may be established between first user terminal 211 as a primary user terminal and user terminal 230 as a designated user terminal upon a predetermined event. The predetermined event may be the receipt of a warning message transmitted from server 300, which is generated when server 300 determines certain incidents occurs in target area 100 based on the analysis result. Or, the predetermined event may be call initiation by the subscriber. When the subscriber finds certain incidents requiring a quick response while watching live view of target area, the subscriber may make a call to a designated person such as a police officer or an emergency center. That is, such a call connection may be established by the subscriber making a call to the designated user terminal in response to the predetermined event such as the warning message. Alternatively, the call connection may be automatically established to the designated user terminal upon the predetermined event. The designated user terminal may be a terminal of a police station or a fire department, which is predetermined according to a type of incident occurring in target area 100. Furthermore, the call connection may be for at least one of a data call session, a voice call session, and a video call session. For example, the subscriber makes a voice call or a video call to a designated person and the subscriber's user terminal is coupled to the designated person's user terminal for a voice call or a video call.

After the call connection is established (S5040), a monitoring information forwarding procedure may be initiated at step S5050. In addition, an associated user interface may be displayed on first user terminal 211 upon the initiation of the monitoring information forwarding procedure at step S5050. For example, the subscriber might want to forward the monitoring information of target area 100, which shows activities or incidents occurring in target area 100, to designated user terminal 230 in order to clearly explain current incidents happening at target area 100. In this case, the subscriber invokes such a monitoring information forwarding procedure. There may be many ways to invoke the monitoring information forwarding procedure. For example, the subscriber may activate an associated application installed at first user terminal 211 while talking to a designated persons such as a police officer using first user terminal 211.

At step S5060, the subscriber may enter data forward information to first user terminal 211 in order to forward the predetermined monitoring information to designated user terminal 230. For example, the associated user interface of the monitoring information forwarding procedure requests the subscriber to enter the data forward information through input processor 201 of first user terminal 211. In response to such request, the subscriber enters data forward information through input processor 201 of first user terminal 211. Such monitoring information forwarding procedure may be a part of the monitoring service and display an associated user interface on a display of first user terminal 211 for interacting with the subscriber, but the present invention is not limited thereto.

The data forward information may be information required for forwarding target monitoring information to a designated user terminal using at least one of the subscriber's registered user terminals. For example, the data forward information may include i) information on target monitoring information to forward, ii) information on the designated user terminal, and iii) information on one of the subscriber's registered user terminal that will be used for forwarding the target monitoring information. Among the data forward information, the subscriber may be required to enter the information on target monitoring information. The information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used to forward the target monitoring information, the data forward information may include session information. The session information is information on a session established between user terminals. Accordingly, the session information may be obtained from user terminals associated with a corresponding session.

The session information may be used to i) determine a designated user terminal, ii) determine a user terminal used to forward target monitoring information, and iii) determine how to transcode the target monitoring information for the designated user terminal. Particularly, call-ID 602 may be used to determine a user terminal used to forward target monitoring information. For example, when the subscriber wants to forward the target monitoring information to designated user terminal 230 using the subscriber's second user terminal 213, a call-ID of second user terminal 213 may be included in the data forward request message.

At step S5070, first user terminal 211 may generate a data forward request message based on the data forward information. For example, request processor 202 analyzes the data forward information. Based on the analysis result, request processor 202 determines a designated user terminal, target monitoring information to forward, and a user terminal to be used for forwarding the target monitoring information. Request processor 202 generates a data forward request message to include entire or a part of the data-forward information. For example, the data forward request message may include the information on target monitoring information and the session information. As described, the information on target monitoring information may include i) a data type of target monitoring information D to forward and ii) a forwarding period (e.g., a forwarding start time T and a forwarding end time or a forwarding duration t). As the information on the designated user terminal and the information on one of the subscriber's registered user terminal that will be used for forwarding the target monitoring information, the data forward request message may include the session information.

At step S5080, request processor 202 of first user terminal 211 may transmit the generated data forward request message to server 300. At step S5090, server 300 may receive the data forward request message from first user terminal 211 and perform an associated authentication procedure. At step S5100, call connection processor 320 of server 300 may generate a request acceptance message in response to the data forward request message after performing the authentication procedure. At step S5110, call connection processor 320 of server 300 may transmit the request acceptance message to the subscriber's first user terminal 211.

At step S5120, server 300 may determine a user terminal to be used for forwarding the target monitoring information based on the received data forward request message. For example, server 300 analyzes the session information included in the data forward request message to determine a user terminal used for forwarding the target monitoring information. For example, server 300 determines whether call-ID information is included in the session information of the data forward request message. When the call-ID information is included, server 300 determines a user terminal associated with the call-ID information as a user terminal to forward the target monitoring information.

At step S5130, server 300 may generate a call connection setup request message based on the data forward information including the information on the target monitoring information (a data type D and a forwarding period T, t) and the session information. At step S5140, server 300 may transmit the generated call connection setup request message to the determined user terminal to be used for forwarding the target monitoring information, for example, the subscriber's second user terminal 213.

At step S5150, second user terminal 213 may establish the requested call connection to designated user terminal 230 based on the session information included in the call connection setup request message. For example, session user terminal 213 determines a designated user terminal based on the session information included in the call connection setup request message and establishes a call connection to the determined designated user terminal, for example, designated user terminal 230.

At step S5160, server 300 may obtain the target monitoring information from container 311 based on the session transfer information. At step S5170, server 300 may transcode the obtained target monitoring information based on information included in the received session transfer request message. For example, server 300 determines a data type of target monitoring information D to forward and a forwarding period T, t thereof based on the information in the session transfer request message. Server 300 retrieves the target monitoring information from container 311 based on the determination result. In addition, server 300 determines hardware or soft specifications of designated user terminal 230 based on the session information included in the received data forward request message. Based on the session information, server 300 determines supported display resolutions of designated user terminal 230, whether SMS/MMS is supported, and so forth. Based on the determination result, server 300 transcodes the obtained target monitoring information to be processable at designated user terminal 230. At step S5180, server 300 may transmit the transcoded target monitoring information to the subscriber's second user terminal 213.

At step S5190, the subscriber's second user terminal 213 may receive transcoded target monitoring information from server 300 and forward the transcoded target monitoring information to designated user terminal 230. For example, second user terminal 213 forwards the transcoded target monitoring from a forwarding start time T until a forwarding end time for a forwarding duration t.

As described, the subscriber can communicate with a designated person (e.g., a police officer) through the subscriber's first user terminal 211 while transmitting the target monitoring information to designated user terminal 230 of the designated person through the subscriber's second user terminal 213.

FIG. 6 shows session information in accordance with at least one embodiment of the present invention.

Referring to FIG. 6, session information 600 may include: a) public user identity (PUID 601) of each user terminal; b) call identifier (call-ID 602) of a user terminal used to forward the target monitoring information; c) supported media and codec (SDP 603); d) information on resolutions supported by a user terminal (capability 604); e) information on whether a short message service (SMS) or multimedia message service (MMS) is supported (SMS/MMS 605); and f) information on a model number of each user terminal (Model code 606). As the PUID, a telephone uniform resource identifier (Tel-URI) or a session initiation protocol uniform resource identifier (SIP-URI) may be included in session information 600.

Session information 600 may be included in data forward information or session transfer information and used to i) determine a designated user terminal, ii) determine a user terminal used to forward target monitoring information, and iii) determine how to transcode the target monitoring information for the designated user terminal. Session information 600 may be obtained from a subscriber or from user terminals. For example, session information 600 may include information required to set up a call.

For example, PUID 601 may be used to determine a designated user terminal or subscriber's registered user terminal. Call-ID 602 may be used to determine a user terminal used to forward target monitoring information. For example, when the subscriber wants to forward the target monitoring information to designated user terminal 230 using the subscriber's second user terminal 213, a call-ID of second user terminal 213 may be included in the data forward request message. SDP 603, Capability 604, and SMS/MMS 605 may be used to determine how to transcode the target monitoring information. For example, server 300 determines display resolutions of a designated user terminal, determines whether a SMS message feature or a MMS message feature is supported by a designated user terminal, and determine hardware or software specification of a designated user terminal based on information in SDP 603, Capability 604, and SMS/MMS 605. Then, server 300 transcodes the target monitoring information based on the determination result. In this case, the monitoring service may be provided to user terminals not installed with a network application or a M2M application required for the monitoring service or not registered at server 300 for the monitoring service.

The session information is described as including six different types 601 to 606 of information in FIG. 6, but the present invention is not limited thereto. The session information may include parts of information shown in FIG. 6 or more information as well.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing, by a server, a monitoring service to a user terminal, wherein the server includes at least one communication circuit, at least one processor, and at least one memory and is configured to collect monitoring information from machine-to-machine (M2M) devices deployed around a target area and monitoring the target area, the method comprising:
   receiving, by the server, a data forward request message from a first one of subscriber's registered user terminals for forwarding target monitoring information collected from the M2M devices at the target area to a designated user terminal;
   processing, by the server, the target monitoring information to be processable at the designated user terminal; and
   transmitting, by the server, a connection request message and the processed target monitoring information to the first one of subscriber's registered user terminals, wherein the first one of subscriber's registered user terminals receives the connection request message and the processed target monitoring information from the server and forwards the processed target monitoring information to the designated user terminal in response to the request message,
   receiving a second data forward request message from the first one of subscriber's registered user terminal,
   transmitting a request acceptance message to the first one, and
   transmitting a second connection request message and the processed target monitoring information to a second one of subscriber's registered user terminals, and
   wherein the first one releases communication connection established to the designated user terminal and wherein the second one establishes communication connection to the designated user terminal in response to the second connection request message and continuously forward the processed target monitoring information to the designated user terminal.

2. The method of claim 1, wherein:
   the subscriber's registered user terminals are user terminals belonging to a subscriber of the monitoring service, registered at the server for the monitoring service, and installed with an application dedicatedly programmed for receiving the monitoring service; and
   the designated user terminal is a user terminal not registered at the server for the monitoring service and not installed with the application dedicatedly programmed for the monitoring service.

3. The method of claim 1, wherein:
   the data forward request message includes first information on the designated user terminal, second information on the target monitoring information, and third information on a data forward user terminal to be used for forwarding the target monitoring information to the designated user terminal; and
   the data forward user terminal is one of the subscriber's registered user terminals.

4. The method of claim 3, wherein the second information includes a data type of the target monitoring information to be forwarded and a forwarding period including a forwarding start time and a forwarding end time.

5. The method of claim 1, wherein the processing the target monitoring information includes:
   determining the designated user terminal based on information included in the received request message;
   determining hardware and software specifications of the designated user terminal based on information included in the received request message;
   obtaining the target monitoring information from monitoring information stored in a container after collected from the M2M devices that are installed around the target area and monitor activities and incidents occurring at the target area; and
   processing the obtained target monitoring information to be processable at the designated user terminal based on the determined hardware and software specifications of the designated user terminal.

6. The method of claim 5, wherein the obtaining the target monitoring information includes:
   determining a forwarding start time and a forwarding end time of the target monitoring information based on the information included in the received data forward request message;
   retrieving the target monitoring information collected and stored from the forwarding start time until the forwarding end time; and
   transmitting the retrieved target monitoring information to the first one of subscriber's registered user terminal until the forwarding end time.

7. The method of claim 1, wherein the transmitting includes:
   determining a data forward user terminal among the subscriber's registered user terminals based on the received data forward request information;
   generating the connection request message including the processed target monitoring information; and
   transmitting the generated connection request message to the determined data forward user terminal.

8. The method of claim 7, wherein the determined data forward user terminal is the first one of subscriber's registered user terminals.

9. The method of claim 7, wherein:
   the determined data forward user terminal is a second one of subscriber's registered user terminals and the second one is different from the first one.

10. A method of a first one of subscriber's registered user terminals for forwarding target monitoring information to a designated user terminal wherein each one of the first one and the designated user terminal include at least one processor, at least one communication circuit, and at least one memory and are configured to receive a monitoring service from a server configured to collect monitoring information from machine-to-machine (M2M) devices deployed around a target area and monitoring the target area and to provide a monitoring service based on the collected monitoring information, the method comprising:

receiving, by the first one, a connection request message with the target monitoring information from the server;

determining, by the first one, the designated user terminal based on the connection request message;

forwarding the received target monitoring information to the designated user terminal, wherein the received target monitoring information is processed by the server to be processable at the designated user terminal, prior to the receiving the connection request message, establishing a communication connection to the designated user terminal for one of a voice call and a video call, wherein the first one forwards the target monitoring information to the designated user terminal through the established communication connection, and after the forwarding the received target monitoring information to the designated user terminal, receiving a request acceptance message from the server and releasing the established communication connection to the designated user terminal, wherein the request acceptance message is generated and transmitted after the server receives a second data forward request message for changing a data forward user terminal from the first one to a second one of the subscriber's registered user terminals.

11. The method of claim 10, wherein:
the subscriber's registered user terminals are user terminals belonging to a subscriber of the monitoring service, registered at the server for the monitoring service, and installed with an application dedicatedly programmed for receiving the monitoring service; and the designated user terminal is a user terminal not registered at the server for the monitoring service and not installed with the application dedicatedly programmed for the monitoring service.

12. The method of claim 10, comprising:
obtaining data forward information;
generating a data forward request message including the obtained data forward information; and
transmitting the generated data forward request message to the server.

13. The method of claim 12, wherein the data forward information includes:
first information on the designated user terminal;
second information on the target monitoring information; and third information on a data forward user terminal to be used for forwarding the target monitoring information to the designated user terminal.

14. A user terminal for forwarding target monitoring information to a designated user terminal, wherein each one of the user terminal and the designated user terminal includes at least one processor, at least one communication circuit, and at least one memory and is configured to receive a monitoring service from a server configured to collect monitoring information from machine-to-machine (M2M) devices deployed around a target area and monitoring the target area and to provide a monitoring service based on the collected monitoring information, the user terminal configured to:

receive a connection request message with target monitoring information from a server of providing a monitoring service;

determine the designated user terminal based on the connection request message; and forward the received target monitoring information to the designated user terminal, wherein the received target monitoring information is processed by the server to be processable at the designated user terminal, wherein the user terminal is configured to establish a communication connection to the designated user terminal for one of a voice call and a video call before receiving connection request message and forward the target monitoring information to the designated user terminal through the established communication connection, and wherein, after the forwarding the received target monitoring information to the designated user terminal, the user terminal is configured to receive a request acceptance message from the server and to release the established communication connection to the designated user terminal, and wherein the request acceptance message is generated and transmitted after the server receives a second data forward request message for changing a data forward user terminal from the user terminal to other user terminal among the subscriber's registered user terminals.

15. The user terminal of claim 14, wherein:
the user terminal is one of subscriber's registered user terminals that belonging to a subscriber of the monitoring service, are registered at the server for the monitoring service, and are installed with an application dedicatedly programmed for receiving the monitoring service; and the designated user terminal is a user terminal not registered at the server for the monitoring service and not installed with the application dedicatedly programmed for the monitoring service.

* * * * *